(12) United States Patent
Westerman

(10) Patent No.: US 6,262,773 B1
(45) Date of Patent: Jul. 17, 2001

(54) SYSTEM FOR CONVERSION OF INTERLACED VIDEO TO PROGRESSIVE VIDEO USING EDGE CORRELATION

(75) Inventor: Larry Alan Westerman, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 08/929,499

(22) Filed: Sep. 15, 1997

(51) Int. Cl.$^7$ .............................. H04N 7/01; H04N 11/20
(52) U.S. Cl. .................. 348/448; 348/441; 348/448; 348/449; 348/450; 348/451; 348/452; 348/458; 348/625; 348/911; 382/266
(58) Field of Search ..................... 348/441, 448, 348/449, 450, 451, 452, 458, 625, 911; 382/266

(56) References Cited

U.S. PATENT DOCUMENTS

| | | | | |
|---|---|---|---|---|
| 4,719,509 | * | 1/1988 | Sakamoto ........................ | 358/112 |
| 5,019,903 | * | 5/1991 | Dougall et al. .................. | 358/140 |
| 5,095,354 | | 3/1992 | Sokawa et al. .................. | 358/105 |
| 5,226,114 | | 7/1993 | Martinez et al. ................. | 395/128 |
| 5,233,421 | | 8/1993 | Christopher .................... | 358/160 |
| 5,307,164 | | 4/1994 | Dong-Il ........................... | 348/448 |
| 5,329,314 | | 7/1994 | Correa et al. ................... | 348/448 |
| 5,428,397 | | 6/1995 | Lee et al. ....................... | 348/448 |
| 5,430,490 | | 7/1995 | Rim ............................... | 348/452 |
| 5,475,438 | | 12/1995 | Bretl .............................. | 348/452 |
| 5,493,338 | | 2/1996 | Hong .............................. | 348/441 |
| 5,517,247 | | 5/1996 | Correa et al. ................... | 348/448 |
| 5,519,451 | * | 5/1996 | Clatanoff et al. ............... | 348/606 |
| 5,532,751 | * | 7/1996 | Lui ................................. | 348/452 |
| 5,550,592 | | 8/1996 | Markandey et al. ............. | 348/448 |
| 5,602,654 | | 2/1997 | Patti et al. ...................... | 358/461 |
| 5,754,710 | * | 5/1998 | Sekine et al. ................... | 382/300 |
| 5,838,385 | * | 11/1998 | Reder et al. .................... | 348/565 |
| 5,886,745 | * | 3/1999 | Muraji et al. ................... | 348/448 |
| 5,929,918 | * | 7/1999 | Pereira ........................... | 348/448 |
| 5,936,676 | * | 8/1999 | Ledinh et al. ................... | 348/452 |
| 5,970,179 | * | 10/1999 | Ito ................................. | 382/261 |
| 6,040,868 | * | 3/2000 | Jun ................................. | 348/448 |

FOREIGN PATENT DOCUMENTS

| | | |
|---|---|---|
| 0790736A1 | 8/1997 | (EP) . |
| 0790736A1 | 2/1996 | (IT) .................. H04N/5/44 |

OTHER PUBLICATIONS

"VLSI Implementation of a Nonlinear Image Interpolation Filter"; IEEE Transactions on Consumer Electronics, vol. 42, No. 3, Aug. 1996, pp. 721–728.

(List continued on next page.)

Primary Examiner—Reinhard J. Eisenzopf
Assistant Examiner—Brian P. Yenke
(74) Attorney, Agent, or Firm—Chernoff, Vilhauer, McClugn & Stenzel. LLP

(57) ABSTRACT

A system processes an image containing a first line and a second line, where the first and second lines includes a plurality of pixels, to generate an interpolated line. The system selects a first and second set of pixels from the lines and generates a first set and second set of filtered values. The system identifies in the first line an edge location in the first set of the filtered values by a first filtered value of the first set of filtered values being at least one of less than and equal to a first predetermined value and a second filtered value of the fist set of the filtered values being at least one of greater than and equal to the first predetermined value. The system also identifies in the second line an edge location in the second set of filtered values by a first filtered value of the second set of the filtered values being at least one of less than and equal to a second predetermined value and a second filtered value of the second set of filtered values being at least one of the greater than and equal to second predetermined value. The system then interpolates based on the edge location of the first line and the edge location of the second line to generate an interpolated pixel of the interpolated line.

36 Claims, 9 Drawing Sheets

OTHER PUBLICATIONS

"Grand Alliance HDTV Multi–Format Scan Converter"; IEEE Transactions on Consumer Electronics, vol. 41, No. 4, Nov. 1995, pp. 1020–1031.

"A Deinterlacer for IQTV Receivers and Multimedia Applications"; IEEE Transactions on Consumer Electronics, vol. 39, No. 3, Aug. 1991, pp. 234–240.

"Interlaced to Progressive Scan Conversion with Double Smoothing"; IEEE Transactions on Consumer Electronics, vol. 39, No. 3, Aug. 1993, pp. 241–246.

"A Motion Adaptive De–Interlacing Method"; IEEE Transactions on Consumer Electronics, Jun. 5, 1992, pp. 145–149.

"Time–Recursive Motion Compensated Deinterlacing"; Elsevier Science Publishers B.V., 1990, pp. 635–642.

"Interlaced to Progressive Conversion by Median Filtering"; Elsevier Science Publishers B.V., 1990, pp. 677–684.

"Spatial Interpolation of Interlaced Television Pictures"; IEEE Transactions on Consumer Electronics, 1989, pp. 1886–1889.

* cited by examiner

|   COL 1 | COL 2 | COL 3 | COL 4 | COL 5 | COL 6 | COL 7 |
|---|---|---|---|---|---|---|
| ? | + | + | − | 0 | + | ? |
|   |   | 50 |   | X |   |   |
|   |   |   |   |   | 52 |   |
| ? | 0 | + | + | − | − | ? |

FIG. 6

| ⋯ 0 | 0 | 0 | 0 | 0 | 0 | + | 0 | − | 0 ⋯ |
| ⋯ 0 | − | 0 | 0 | 0 | + | 0 | 0 | 0 | 0 ⋯ |
|   |   |   |   | X |   |   |   |   |   |
| ⋯ 0 | 0 | 0 | + | 0 | 0 | − | 0 | 0 | 0 ⋯ |
| ⋯ − | 0 | 0 | 0 | − | 0 | 0 | 0 | 0 | 0 ⋯ |

| ⋯ + | 0 | 0 | 0 | 0 | 0 | + | 0 | − | 0 ⋯ |
| ⋯ 0 | − | 0 | + | 0 | + | 0 | 0 | 0 | 0 ⋯ |
|   |   |   |   | X |   |   |   |   |   |
| ⋯ 0 | 0 | 0 | + | 0 | + | − | 0 | 0 | 0 ⋯ |
| ⋯ − | 0 | 0 | 0 | − | 0 | 0 | 0 | + | 0 ⋯ |

FIG. 8

SYSTEM FOR CONVERSION OF INTERLACED VIDEO TO PROGRESSIVE VIDEO USING EDGE CORRELATION

BACKGROUND OF THE INVENTION

The present invention relates to a video format conversion system, and in particular to a video format conversion system for converting interlaced video into progressive video.

Video displays generally have a plurality of scan lines that are displayed at regular intervals. Traditional displays, such as those used in regular television displays, have used interlaced scan displays. Interlaced systems divide the scan lines of each frame of video into two fields, each of which consists of one half (every other line) of the total number of scan lines in the frame. The resolution of interlaced scan displays is limited because each field is separately displayed with the lines of the alternate field being black. As an example of an interlaced system, in an NTSC system each interlaced field is displayed every ⅟₆₀th of a second and a complete frame is displayed every ⅟₃₀th of a second (two fields).

Higher quality displays, such as high definition television, use a progressive scan display system. In a simple progressive scan display system, the number of scan lines visible at a given instant is twice that which is visible in a corresponding interlaced system. Progressive video means that every line of the image signal is successively displayed instead of every other line as contemplated by the term interlaced video. In other words, the term progressive video means not interlaced video.

The conversion from interlaced video to progressive video may be accomplished by scanning the interlaced video at twice the horizontal rate to double the number of scan lines of video information. Each line of interlaced video of a field is displayed and the missing lines (that would normally be black) between the lines of the interlaced video are interpolated.

Many systems for interpolating video pixel information of interlaced video to progressive video are known. Such systems can be broadly categorized into one of three types.

The first type of interpolation system is intra-field interpolation which involves interpolating the pixels of lines not scanned by using the pixels of scanned lines only in the current field. Normally such systems result in a deterioration of image quality because each line is interpolated in some manner by the mean value of pixels on directly adjacent upper and lower lines with respect to the line being interpolated. The simplest intra-field system averages the value of the pixel immediately above and the value of the pixel immediately below the interpolated pixel to obtain an average pixel value. While filling the black regions between interlaced lines of video, this particular intra-field method neither provides for sufficient image quality nor eliminates flicker associated with small details.

The second type of interpolation system is inter-field interpolation which involves interpolating lines not scanned during the current field by using scanned lines of the current field together with scanned lines of past and/or future fields, without any motion compensation. Although this method may result in high image quality for video with stationary scenes, severe artifacts arise for video portions that involve motion. An alternative inter-field interpolation method stores one field and uses it to fill the spaces in the following field. This approach is satisfactory except for video portions that involve motion because a moving object will be at different locations in adjacent fields. In other words, such an interpolated frame, consisting of two superimposed fields, will present a moving object at one location on even lines and at another location on odd lines, thus producing a double image of the object.

The third type of interpolation system is interpolation with motion compensation which attempts to solve the problems encountered with the presence of motion associated with the intra-field interpolation method and the inter-field interpolation method without motion compensation. However, motion compensation normally requires substantially more computation, at increased time and expense. Many interpolation systems try to compensate for the presence of motion by sampling pixel values in an area around the desired pixel and extending the sampling of pixels to past and future fields in the region of the desired interpolated pixel. Difficulties of motion compensation for interlaced video include compensating for the sampling of pixels that are not in the same spatial location in the immediately prior and immediately subsequent fields of the field including the interpolated pixel. Also, in the event of a scene change, i.e., an event involving a substantial amount of video change, such systems tend to fail.

Lee et al., U.S. Pat. No. 5,428,397, disclose a video format conversion system for converting interlaced video into progressive video using motion-compensation. The Lee et al. system uses both an intra-field technique and an inter-field technique to achieve the conversion. The system determines if the current pixel is stationary, and if so then an inter-field technique is used to determine the value of the interpolated pixel. In contrast, if the system determines that the current pixel is in motion, then an intra-field motion compensating technique is used to determine the value of the interpolated pixel. In particular, the intra-field technique taught by Lee et al. uses a simple luminance mean calculating circuit connected to a pair of line delay circuits. Accordingly, the relatively fast inter-field technique is used on the non-motion portions and the relatively slow intra-field technique is used on the motion portions for which the relatively fast inter-field technique is not suitable.

Bretl, U.S. Pat. No. 5,475,438, discloses a pixel interpolation system for developing progressive line scan video from two interlaced fields of video, using both an intra-field technique and an inter-field technique. An intra-field pixel value is determined by averaging the pixel luminance in the line above and the pixel luminance in the line below the desired pixel. A motion value is determined indicative of motion of the image. An inter-field pixel value is determined by comparing the intra-field pixel value with the corresponding pixels in the previous and subsequent frames. The motion value is used to proportion the intra-field and the inter-field pixel values to compute a value for the desired pixel. The system taught by Bretl is computationally complex, thus requiring expensive electronics and excessive time to compute.

Simonetti et al., in a paper entitled A DEINTERLACER FOR IQTV RECEIVERS AND MULTIMEDIA APPLICATIONS, disclose a system for converting interlaced video to progressive scan video. Simonetti et al. suggest that their objective is to improve picture quality with a fast, low-cost device by using simple but effective algorithms with an optimized design flow and silicon technology suitable for ASIC developments. The system includes motion detection by computing the absolute luminance differences between selected pixels, and thereafter selecting either an intra-field or inter-field interpolation technique. When motion is detected, an intra-field technique is used to attempt to avoid smearing the borders of objects in the proximity of the pixel. Simonetti at al. attempt to keep the blurring low by performing an interpolation along a direction of high correlation of the luminance data in the vicinity of the pixel. The algorithm taught by Simonetti et al. includes performing an extensive number of comparisons (conditional executions) for each pixel and then selecting the proper action based upon one or more of the comparisons. Unfortunately, in conventional RISC processors conditional executions, which are used to perform such comparison operations, require substantial time to execute. Accordingly, to maximize computational speed when using a RISC processor, the number of conditional executions should be minimized.

Hong, U.S. Pat. No. 5,493,338, discloses a system for converting interlaced video to progressive video by utilizing a three dimensional median filter. The three dimensional median filter applies a weighing factor to pixel luminance components of horizontal, vertical, and diagonal directions of the pixel component's periphery to be interpolated by horizontal, vertical, and time axis judging signals. However, Hong does not use edges in the video when determining pixel interpolation which may result in decreased image quality.

Marsi et al., in a paper entitled VLSI IMPLEMENTATION OF A NONLINEAR IMAGE INTERPOLATION FILTER, disclose the conversion of interlaced video to progressive video by interpolating along either the vertical or the horizontal direction using an operator function. The operator function is designed to preserve edges within an image. However, such an operator function does not account for image movement or provide adequate results for non-horizontally or non-vertically oriented edges.

Dong-I1, U.S. Pat. No. 5,307,164, discloses a system for conversion of interlaced video to progressive video by linearly interpolating through a slant correlation of a low-pass interpolation signal and through "0" insertion of a high-pass interpolation signal in a vertical direction. The slant correlation technique involves obtaining the mean luminance value of highly correlated pixels, wherein the correlation of the pixels is detected in diagonal directions and vertical directions by a series of calculations. Thereafter, the greatest correlation (smallest mean value) is determined by a series of comparisons and used to select which two pixels to average in order to calculate the interpolated pixel.

Patti et al., U.S. Pat. No. 5,602,654, disclose a two-step, contour sensitive deinterlacing system especially suitable for obtaining still images from interlaced video. The first step determines for each missing pixel of an interlaced field whether the absolute difference between the luminance of the pixels above and below the missing pixel is greater than a preselected threshold value. If it is decided that the missing pixel lies at a low-vertical frequency location, its value is estimated via vertical interpolation. Otherwise, the second step determines whether or not there is a well-defined contour passing through the missing pixel, and determines the contour's direction if there is one by comparing blocks of pixels. In the presence of a well defined contour, the missing pixel is obtained by averaging the intensity values along the direction of the contour in the field lines immediately above and below the missing field line. However, the computational requirements necessary to process the blocks of data, as taught by Patti et al., to determine the contours are excessive.

Martinez et al., in a paper entitled SPATIAL INTERPOLATION OF INTERLACED TELEVISION PICTURES, teach a system for converting interlaced video to progressive video by an algorithm that attempts to determine edges of features within an image by using corresponding sets of pixels of two adjacent lines of interlaced video. The algorithm is based on a line shift model, in which small segments of adjacent raster scan lines are assumed to be related by a spatially varying horizontal shift. The algorithm taught by Martinez et al. involves two steps. The first step is to estimate of the velocity obtained from a window of image samples surrounding the point of interest. For color pictures, this operation is carried out only on the luminance component. In order to compute the velocity estimate Martinez et al. teach that a set of linear equations must be solved for each point, which is computationally intensive and potentially requires expensive electronics. The second step involves projecting the velocity estimate onto the two lines adjacent to the desired interpolated pixel and the image intensities at the corresponding points are averaged together. For color pictures, this operation takes place on each component color.

Conceptually the algorithm taught by Martinez et al. can be thought of as fitting a surface to a series of points on two adjacent interlaced lines of video. Then at the point of interest the gradient is determined, which is the direction of the steepest slope on the surface to that point of interest. The perpendicular to that gradient is the flattest portion at that point on the surface and is considered an edge to a feature. The interpolation is performed with pixels generally along that perpendicular to maintain the contour of the edge. Accordingly, Martinez et al. teach that pixel values from both lines are used to compute the interpolated line of pixels. Further, when proceeding to the next set of two lines of interlaced video, one line of which was used for the interpolation of the preceding interpolated line, there is no reusable data to simplify the calculations because of the "surface" nature of the calculations.

What is desired, therefore, is a system for converting interlaced video to progressive video that is not computationally intensive and results in retaining edge information for features within the video.

SUMMARY OF THE INVENTION

The present invention overcomes the aforementioned drawbacks of the prior art by providing a system for processing an image containing at least a first line and a second line, where each of the first and second lines includes a plurality of pixels, to generate an interpolated line where the interpolated line includes a plurality of interpolated pixels located intermediate the first and second lines. The system selects a first set of pixels from the first line and a second set of pixels from the second line and generates a first set of filtered values by filtering the first set of pixels with a first filter and a second set of filtered values by filtering the second set of pixels with a second filter. The system identifies in the first line at least one edge location in the first set of the filtered values by a first filtered value of the first set of filtered values being at least one of less than and equal to a first predetermined value and a second filtered value of the first set of the filtered values being at least one of greater than and equal to the first predetermined value. The system also identifies in the second line at least one edge location in the second set of filtered values by a first filtered value of the second set of the filtered values being at least one of less than and equal to a second predetermined value and a second filtered value of the second set of filtered values being at least one of greater than and equal to the second predetermined value. The system then interpolates based on the at least one edge location of the first line and the at least one edge location of the second line to generate at least one of the interpolated pixels of the interpolated line.

In an alternative embodiment the system includes a third line which includes a plurality of pixels and the interpolated pixels are located intermediate the first and third lines. The system selects a third set of pixels from the third line and generates a third set of filtered values by filtering the third set of filtered values with a third filter. The system selects at least one of a plurality of putative edge features based upon a first selection criteria where each putative edge feature is defined by a set of filtered values including at least one filtered value of the first set of filtered values, at least one filtered value of the second set of filtered values, and at least one filtered value of the third set of filtered values. The first selection criteria is defined by at least two of the at least one filtered value of the first set of filtered values, the at least one filtered value of the second set of filtered values, and the at least one filtered value of the third set of filtered values being at least one of greater than and equal to a predetermined value and at least one of less than and equal to the predetermined value. The system interpolates based on selecting at least one of a plurality of putative edge features to generate at least one of the interpolated pixels of the interpolated line.

In the preferred embodiment a fourth line of pixels is used and the putative edge feature includes the fourth line of pixels. The system then includes a second selection criteria defined by at least two filtered values of, a filtered value of the first set of filtered values, a filtered value of the second set of filtered values, and a filtered value of the third set of filtered values being the non-selected one of the at least one of the greater than and equal to the predetermined value and the at least one of the less than and equal to the predetermined value of the putative selection selected as a result of the first selection criteria. The system then interpolates based on selecting at least one of a plurality of putative edge features including the first selection criteria and not the second selection criteria to generate at least one of the interpolated pixels of the interpolated line.

In both embodiments the system converts interlaced video to progressive video using a technique that is not computationally intensive and results in retaining edge information for features within the video. Also, the technique maintains edge details of an image when encountering luminance changes, such as shadows obscuring an edge feature. The principal technique used to maintain such edge features is by not directly using the pixel luminance values themselves but instead using "binary" edge features which provides higher resultant image quality. Another advantage of the system is that each set of calculations performed on a single line of interlaced video may be used for both the interpolated pixels above and below the line of interlaced video, without recalculation of the pixels values using the filter.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 3 is a representation of pixels, a portion of two lines of interlaced video.

FIG. 4 is a set of sample pixel luminance values.

FIG. 5 is a set of filtered values obtained by filtering the pixels of FIG. 4 with a [−1+2 −1] filter.

FIG. 6 is a set of polarity values of the filtered values of FIG. 5 used to identify edge features.

FIG. 7 is a set of thresholded values containing primarily zeros with scattered positive (+) and negative (−) values obtained by passing a set of filtered values through a threshold filter.

FIGS. 8–12 show a set of exemplary selection criteria for the thresholded values of FIG. 7.

DETAILED DESCRIPTION OF THE PREFERRED EMBODIMENT

Figure 1:
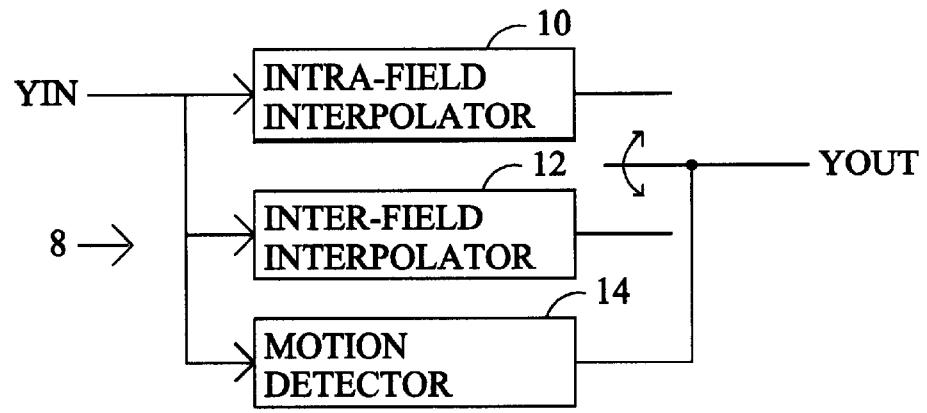
FIG. 1 is a block diagram of an exemplary system that includes an intra-field interpolator, an inter-field interpolator, and a motion detector.

Referring to FIG. 1, a combination intra-frame and inter-frame motion adaptive interpolation system 8 includes an input luminance signal $Y_{in}$. $Y_{in}$ is used for interpolating a line within the field to be interpolated by an intra-field interpolator 10 and an inter-field interpolator 12. Based upon the judgment of a motion detector 14 that judges motion within the input image, a pixel to be interpolated within a region corresponding to the motion is interpolated either with the intra-frame interpolator 10 or with the inter-field interpolator 12. It is to be understood, that the system of the present invention may include any suitable system for inter-field determinations and motion detection. Also, the system may include only an intra-field interpolator, if desired.

Figure 2:
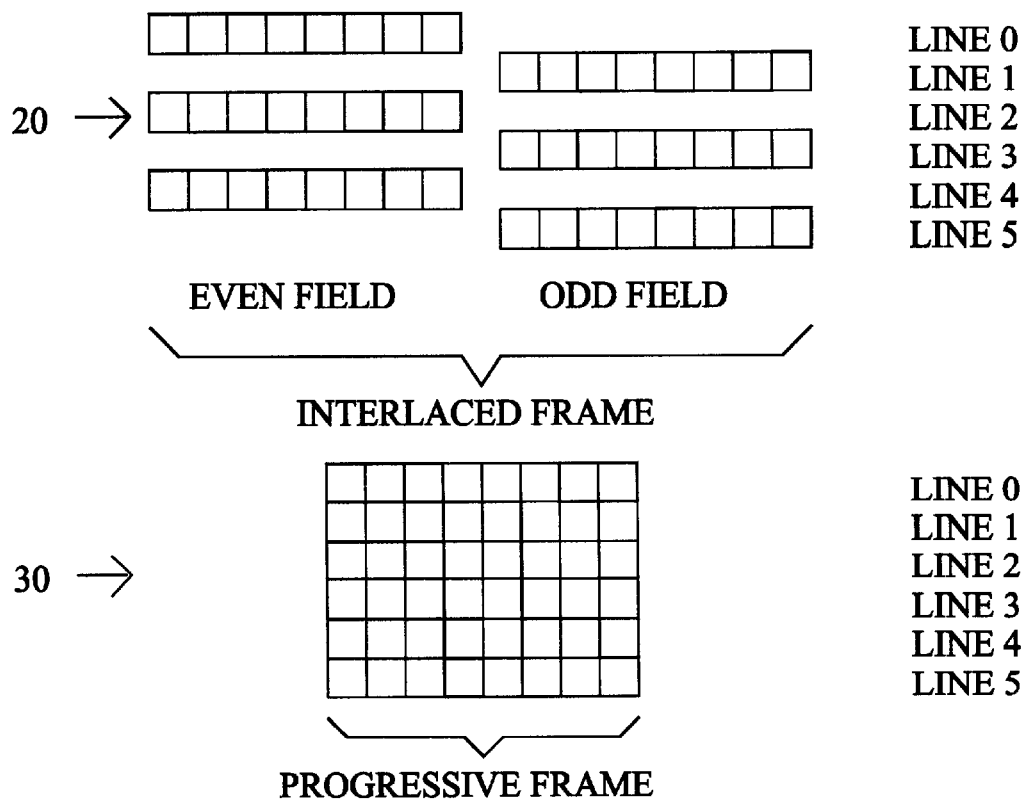
FIG. 2 is a representation of interlaced video and progressive video.
Figure 9:
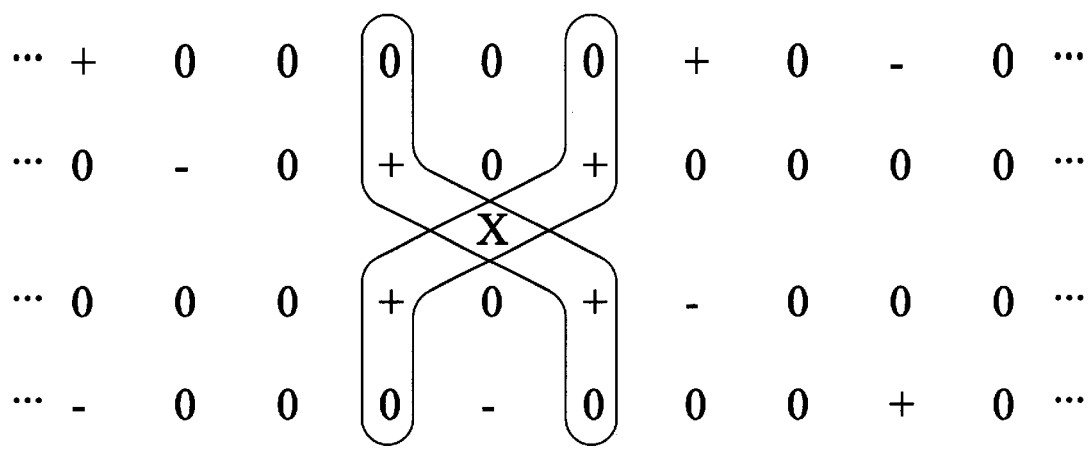
Figure 10:
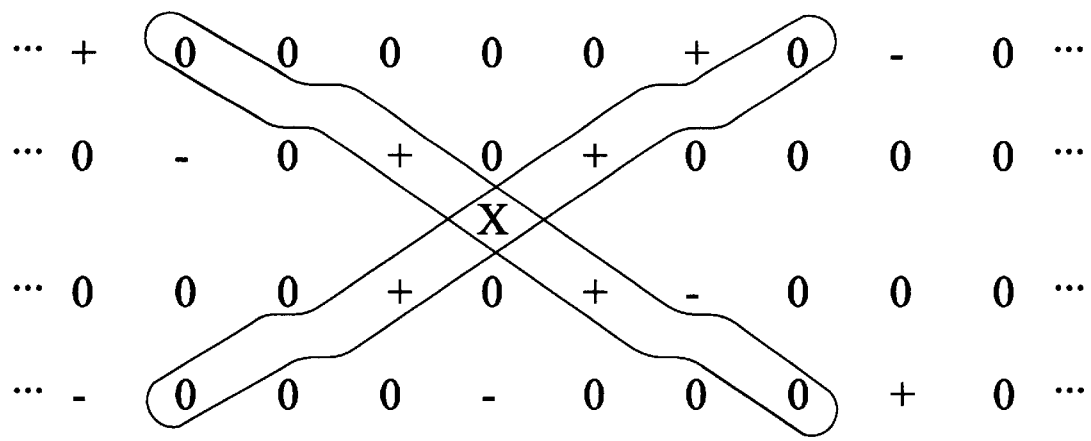
Figure 11:
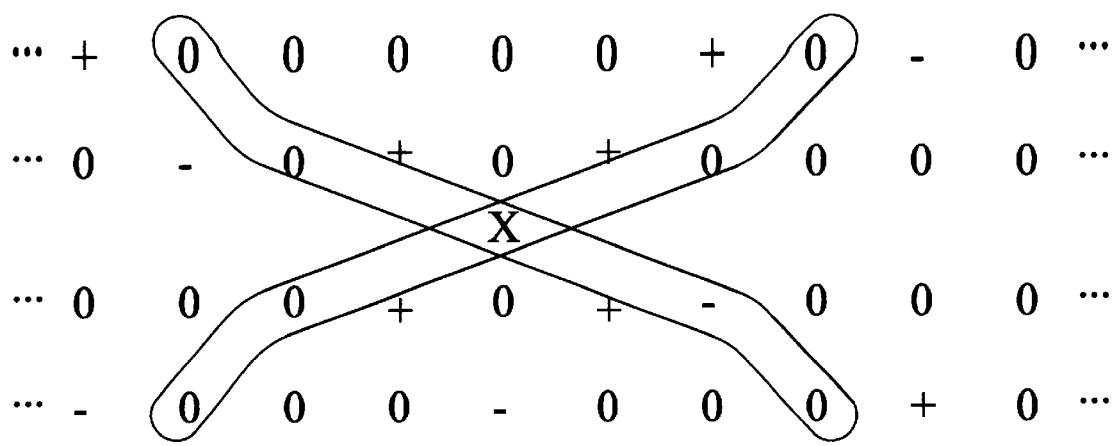
Figure 12:
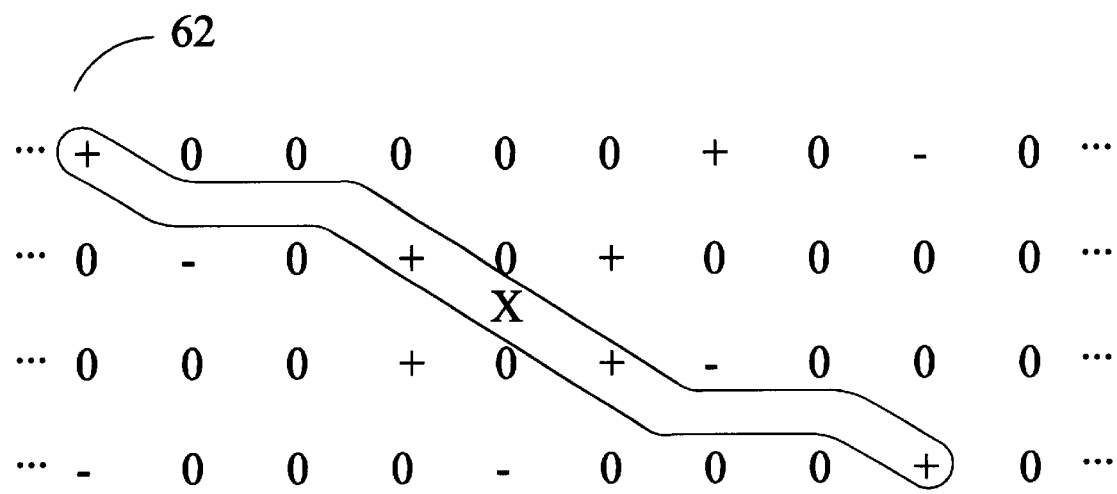

Referring to FIG. 2, as previously described interlaced video has an image spread over two different fields of a frame. In order to convert interlaced video 20 to progressive video 30 for displays such as high definition television, the interpolated pixels between the scan lines of the interlaced video 20 need to be determined. A technique that is chosen to determine the interpolated pixels should provide a high quality image free from artifacts.

Referring to FIG. 3, an interpolated pixel X may be calculated from a given set of sequential pixels A–G of a portion of a line of interlaced video and sequential pixels H–N of a portion of a subsequent line of interlaced video. Preferably, pixels H–N are from the next line of interlaced video. It is to be understood that the system can use any suitable number of pixels above and below the interpolated pixel X. Preferably, the pixels are both sequential in order and symmetrical around the interpolated pixel X.

Many current interpolation techniques encounter difficulty maintaining edge details of an image when encountering luminance changes, such as shadows obscuring an edge feature. The inventor came to the realization that many current interpolating techniques directly use the pixel luminance values of different interlaced lines of video to identify edge features within the image. In contrast to the identification of edge features by directly using the pixel luminance values themselves, the inventor determined that the correlation of "binary" edge features provides higher resultant image quality.

The inventor observed that fitting a "surface," as taught by Martinez et al., requires the simultaneous computation using pixel intensity values from a portion of both surrounding lines for each interpolated pixel of an interpolated line. When computing the interpolated pixels for the next interpolated line, the pixel intensity values of the shared line of interlaced video (the line between the two interpolated lines) are reused to recompute the next "surface." In contrast to the teachings of Martinez et al., the inventor came to the realization that using an interpolating technique that computes a function, or otherwise uses a filter, for each portion of an interlaced line of video, where the function of each line is independent of the other lines of interlaced video, permits a subsequent calculation for the next interpolated line to reuse the prior calculation performed on the shared line of interlaced video. In other words, each set of calculations performed on a single line of interlaced video may be used for both the interpolated pixels above and below the line of interlaced video. Using this insight, the inventor postulated that typical contours representative of an edge feature along a line of an image may be determined from either a second order filter or a high pass filter. Alternatively, any other suitable filter, such as for example, Guassian or Sobel, may be used. Such edge features may include intensity changes from low luminance to high luminance, or intensity changes from high luminance to low luminance.

Referring to FIG. 4, a set of sample pixel luminance values are shown. An exemplary second-order zero-crossing filter to be applied to the luminance values may be [−1 +2 −1]. The [−1 +2 −1] filter calculates the second derivative of three adjacent pixels of the data. The zero order crossing filter is applied to each pixel of an interlaced line of pixels by calculating the summation of the preceding luminance pixel value multiplied by −1, the current pixel value multiplied by +2, and the subsequent pixel value multiplied by −1. The set of filtered values resulting after filtering the pixels of FIG. 4 with the [−1 +2 −1] filter is shown in FIG. 5. The resulting magnitudes of the filtered values from the zero-crossing filter applied to a line of interlaced video are not important in determining the existence of edge features, but rather the polarity values (positive or negative) of the filtered values from the zero-crossing filter, as shown in FIG. 6, are used to identify edge features. Changes from positive (+) to negative (−), or from negative (−) to positive (+) of adjacent pixels identifies an edge feature at that location. In addition, a change from positive (+) to negative (−) to positive (+), or from negative (−) to positive (+) to negative (−) of adjacent pixels may either be indicative of an edge feature or noise. A change from negative (−) or positive (+) to zero (0) may indicate an edge feature if desired.

It is to be understood that the zero-crossing filter may use non-adjacent pixels, if desired. The number of pixels used to calculate each positive, zero, or negative filtered value of from a set of luminance values may be selected, as desired. In addition, the particular filter selected may result in a set of filtered values that are not centered around zero for the identification of edge features. In such a case the identification of edge features may be based on a change from "less than" or "equal to" a predetermined value to "greater than" or "equal to" the predetermined value. Alternatively, change may be from greater than or equal to the predetermined value to less than or equal to the predetermined value. Filtered values that match the predetermined value (zero or non-zero) may be used as indicative of edge features, if desired. Alternatively, filtered values that match the predetermined value may be disregarded and the filtered values to either side of the predetermined value(s) may be used.

The inventor realized that if a principal purpose of the interpolation system is to detect and maintain edges within the image, then the general characteristic change within each set of filtered values of two or more interlaced lines indicative of an edge feature should correlate if an edge passes through them. Accordingly, the inventor came to the realization that the edge features of two or more lines of interlaced video should be related to each other. The edge features can be tracked across the gap between the interlaced lines by identifying the edge feature closest to the column in the line above the line in which pixel X is located. Referring again to FIG. 6, for the upper line (the line above the interpolated pixel X) the closest edge feature is column 3 to column 4 as the sign changes from positive (+) to negative (−). The change from negative (−) to zero (0) of column 4 to column 5 may be indicative of an edge feature, albeit likely a smaller edge feature than a polarity change. In addition, the negative (−) to zero (0) to positive (+) of columns 4–6 may be ignored, if desired.

Next, the lower line (the line below the interpolated pixel X) is searched for an edge feature on the opposite side of the interpolated pixel X from the edge feature identified in the other line, which is indicated by the positive (+) to negative (−) edge feature of columns 4 to column 5 (FIG. 6). If multiple edge features (transitions) are located in the neighborhood of X in the lower line, then the transition location for which the lower line pixel luminance most closely matches the pixel luminance of the edge feature in the upper line is selected as the matching point. There is a limited region of columns about the interpolated pixel X over which edge features are searched for, such as, for example, three columns to either side of the interpolated pixel X. After identifying the edge transitions about the interpolated pixel X, a linear interpolation is performed along the direction defined by the edge. Referring again to FIG. 6, the linear interpolation of the interpolated pixel X is the pixel luminance of pixel 50 and pixel 52, namely, (9+10)/2. Alternatively, any other suitable interpolation technique may be used based on the edge features.

It is to be understood that the calculations performed on the upper and the lower lines may be reversed, if desired. Further, the lines of interlaced video used to interpolate pixel X do not necessarily need to be the lines immediately above and below the interpolated pixel X.

As previously described, the aforementioned technique is described in terms of either a positive, a negative, or a zero value. Alternatively, depending on the zero-crossing filter selected, which may include an offset factor, the comparisons for identifying edge features may be values other than positive and negative.

In the event that no edge correlation is determined, a vertical interpolation technique is used.

An alternative interpolating technique uses a high pass filter on the luminance values, such as [+1+3 −3 −1]. The [+1 +3 −3 −1] high pass filter identifies the high frequency content of a set of pixels which is indicative of an edge feature. The high pass filter is applied to each pixel of an interlaced line of pixels by calculating the summation of the second preceding luminance pixel value multiplied by +1, the preceding pixel value multiplied by +3, the current pixel value multiplied by −3, and the next pixel value multiplied by −1. Alternatively, the high pass filter may be shifted to the right so the preceding pixel value is multiplied by +1, the current pixel is multiplied by +3, the next pixel is multiplied by +1, and the next pixel value is multiplied by +3. The filtered values from the high pass filter of a line of interlaced video is then applied to a threshold function to assign filtered values the value of zero that have an absolute value less than a predetermined threshold. This sets lower frequency components to the same value, preferably zero, as less indicative of edge features. The remaining non-zero values indicate the existence of high frequency features within the image, such as an edge feature. The magnitudes of the resulting non-zero filtered values from the high frequency filter applied to a line of interlaced video are not important in determining the existence of edge features but rather the polarity values (positive or negative) from the thresholded high pass filter are used to identify edge features. Changes from positive (+) to negative (−), or from negative (−) to positive (+) of adjacent pixels identifies an edge feature at that location. In addition, a change from positive (+) to negative (−) to positive (+) of adjacent pixels or from negative (−) to positive (+) to negative (−) of adjacent pixels may either be indicative of an edge feature or noise.

It is to be understood that the high pass filter may use non-adjacent pixels if desired. The number of pixels used to determine each positive, zero, or negative filtered value may be selected as desired. In addition, the particular high pass filter used may result in a set of filtered values that are not centered around zero to which a threshold filter is applied. In such a case the threshold filter would eliminate, or otherwise set to a constant, a range of filtered values indicative of low frequency features of the image. In such a case the identification of edge locations may be based on a change from "less than" or "equal to" a predetermined value to "greater than" or "equal to" the predetermined value. Alternatively, the identification of edge locations may be based on a change from greater than or equal to the predetermined value to less than or equal to the predetermined value. Preferably, the predetermined value would be the value to which the low frequency features are set, such as zero.

With the proper selection of the threshold values the resulting matrix of values contains primarily zeros with scattered positive (+) and negative (−) values, such as exemplified by FIG. 7. The preferred technique includes the use of two lines above and two lines below the interpolated pixel X. The system compares the polarity values of the filtered pixel values on the lines above and the lines below the interpolated pixel X among a set of different general directions about the interpolated pixel X. The system may use any suitable set of filtered pixel values about the interpolated pixel X. By extending the system to include two lines above and two lines below the interpolated pixel X the system can more readily identify significant edge features. If desired, the system may use fewer or additional lines above and/or below the interpolated pixel X.

Based on the general angle being examined about pixel X, or otherwise the selected set of filtered values, the preferred putative selection criteria are the same positive or negative sign values in the line directly above and the line directly below the interpolated pixel X and at least one of the second line above and the second line below the interpolated pixel X. The multiple sets of pixels at different angles may be selected as desired, such as those shown in FIGS. 8–12. In the examples of FIGS. 8–12, selections 60 and 62 match such a criteria. Alternatively, the criteria may be any suitable number of the same sign value on any set of suitable lines in a general direction, or otherwise any selected set of filtered values, about the interpolated pixel.

Figure 13:
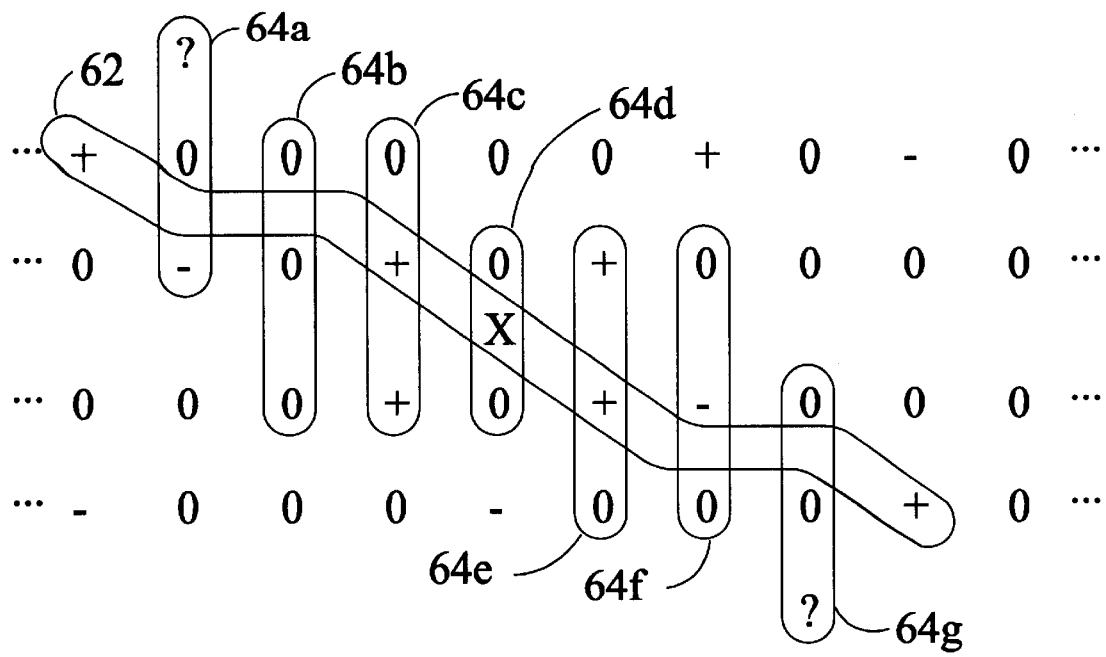
FIG. 13 shows a set of vertical edge conditions for the selection criteria of FIG. 12.
Figure 14:
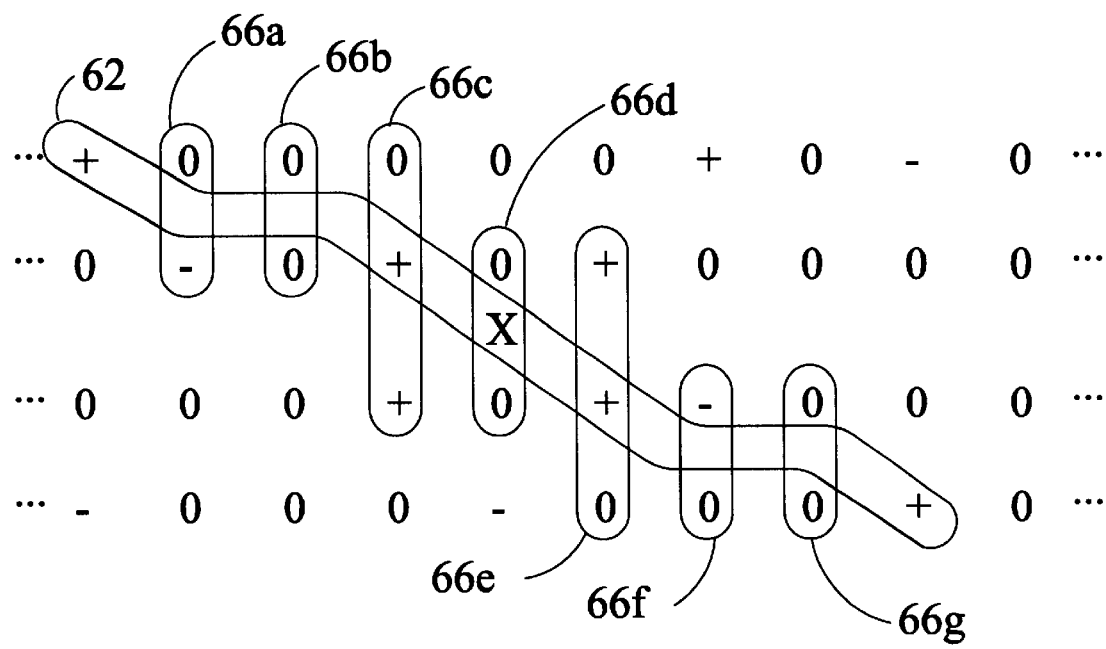
FIG. 14 shows an alternative set of vertical edge conditions for the selection criteria of FIG. 12.
Figure 15:
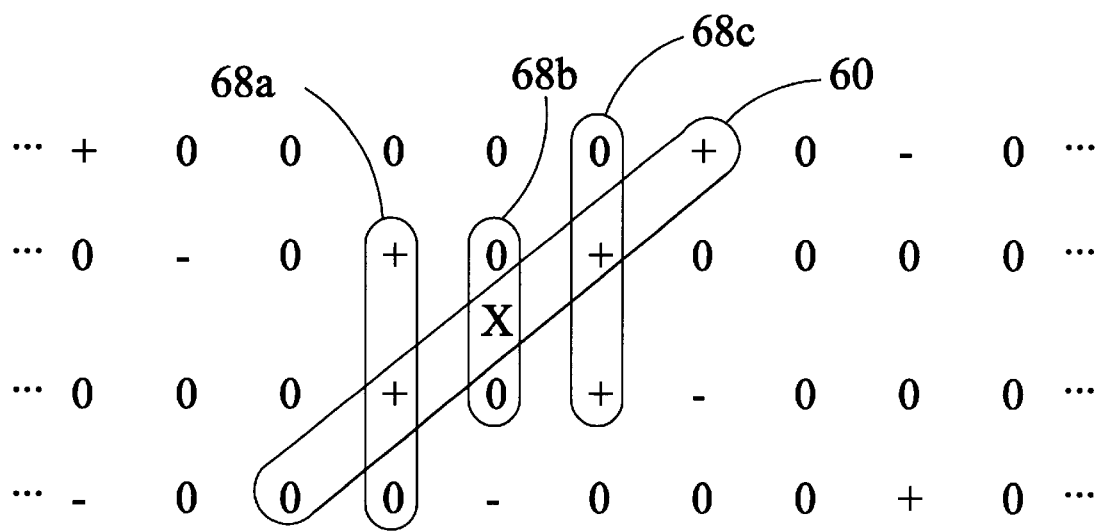
FIG. 15 shows a set of vertical edge conditions for one of the selection criteria of FIG. 8.

For those sets of pixels that match the putative selection criteria then a second test is preferably performed. For each initial match the system checks the filtered values to ensure that an opposing edge of opposite sign does not cross the putative edge feature. The opposing edge may be checked in the vertical direction across the line at intermediate pixel locations from each end of the line (set of pixels). Referring to FIG. 13, for the putative selection 62 the seven vertical edge conditions 64*a*–64*g* would be checked, as shown, to ensure that negative (alternate polarity) values are not present on both sides of the selection 62. Alternatively, referring to FIG. 14, the system may check vertical edge conditions 66*a*–66*g* of pixels above and below the selection 62, such as shown in FIG. 14. Referring to FIG. 15, the putative selection 60 has a greater slope than the putative selection 62 of FIG. 12. Accordingly, several fewer checks are necessary to validate the non-crossing of an opposite polarity edge. Accordingly, for generally horizontal lines the greater number vertical opposing edge conditions to be checked increases the likelihood of removing that putative line as a candidate. This counterbalances the false tendency of such low angle horizontal lines to indicate an edge feature because the filtered values used for the edge feature are distant from one another, and may in fact be related to different edge features. The more vertically oriented lines are less likely to be removed by such an additional opposing edge condition check.

It is to be understood that the vertical conditions may check pixel values close to or more distant from the line as desired, and need not actually cross the line of the putative edge feature (e.g., the opposing check pixels are all to one side of the line). In addition, the vertical conditions may be at an oblique angle, if desired. Preferably, the vertical pixels checked only extend the length of the pixels indicating the putative edge feature.

Figure 16:
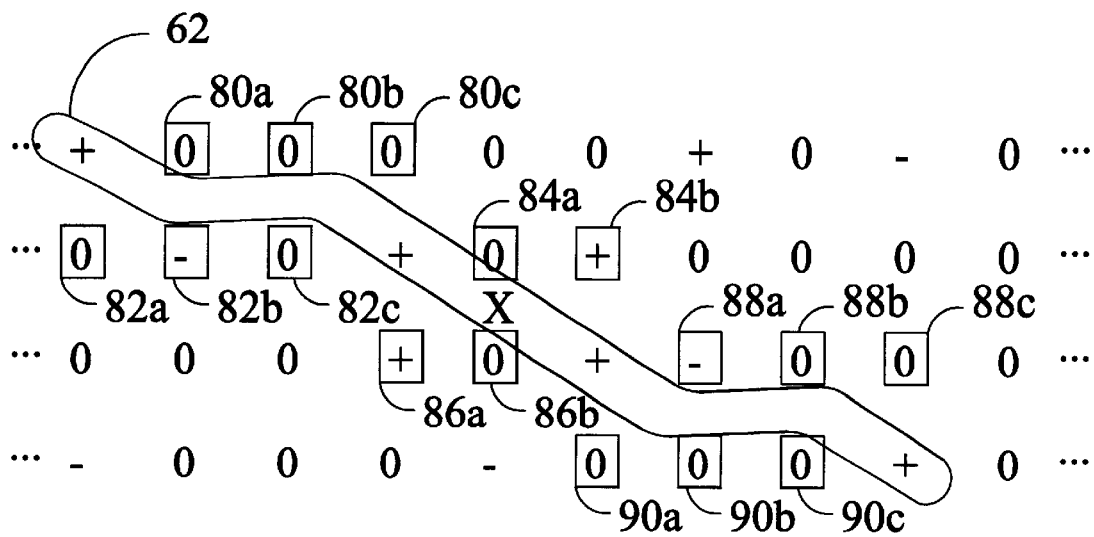
FIG. 16 shows an edge selection test.

Alternatively, for those sets of pixels that match the putative selection criteria an alternative second test may be performed. For each initial match the system checks the filtered values to ensure that an opposing edge of opposite sign does not cross the putative edge feature. The opposing edge may be checked in both an oblique angle and a vertical direction by checking groups of pixels on either side of the putative edge feature. Referring to FIG. 16, a set of three upper pixels 80*a*–80*c* are checked to determine if any has a negative (alternate polarity) value and a set of three lower pixels 82*a*–82*c* are checked to determine if any has a negative (alternate polarity) value. If a negative (alternative polarity) value is determined for at least one of the upper pixels 80*a*–80*c* and at least one of the lower pixels 82*a*–82*c* then the putative selection 62 is removed as an edge feature candidate. Also, a set of two upper pixels 84*a*–84*b* and a set of two lower pixels 86*a*–96*b* are checked in the same manner as pixels 80*a*–80*c* and 82*a*–82*c*. In addition, a set of three upper pixels 88*a*–88*c* and a set of three lower pixels 90*a*–90*c* are checked in the same manner as pixels 80*a*–80*c* and 82*a*–82*c*. Using blocks of pixels allows for the detection of opposing edges at different oblique angles with fewer comparisons than would be required if each combination of the pixels in the respective blocks were compared to each other.

It is to be understood that the pixel groups may check pixel values close to or more distant from the line, as desired, and need not actually cross the line of the putative edge feature (e.g., the opposing check pixels are all to one side of the line). Also, the pixel groups may extend only the length of the pixels indicating the putative edge feature, if desired. The pixel groups may include any suitable number of pixels and number of separate groups, as desired.

It was determined by the inventor that frequently the putative edge that satisfies either of the aforementioned second tests may still not be an actual edge feature. In many cases such erroneous edge features may be determined by mere coincidence in regions of an image that contains excessive texture. To determine if the putative edge is more likely an actual edge feature the system may further include checking for same polarity edges that cross the putative edge feature. The system preferably does not consider pixels close to the putative edge, such as within one pixel distance from the line, to permit edge features of greater width to still be considered edge features. The preferred selection of the same polarity pixels are those within a rectangle defined by the limits of the length of the line and greater than one pixel distant from the line. If any of the preferred selection of the same polarity pixels have the same polarity then the putative edge feature is not selected.

Figure 17:
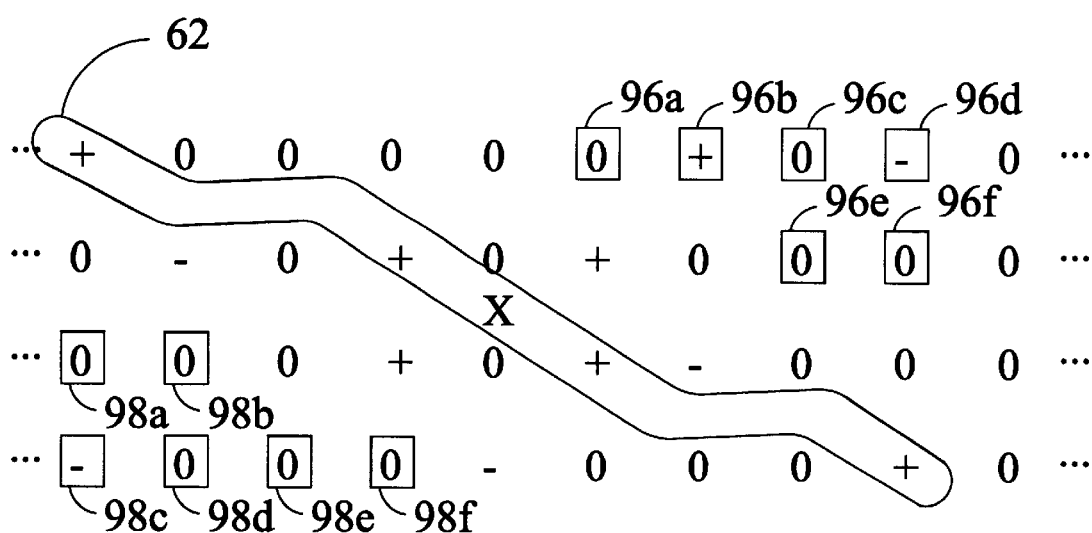
FIG. 17 shows an edge putative selection for FIG. 16.

Referring to FIG. 17, for the putative selection 62 the preferred selection of the same polarity pixels would be 96a–96e and 98a–98e. Alternative pixels and the criteria used for matching the same polarity pixels may be selected, as desired.

In the event of no edge correlation, a vertical interpolation technique is used.

Alternatively, a match among any three or four pixels values of the four lines of interlaced video along in a general direction about the interpolated pixel X may be used. In addition, additional lines of interlaced video may be used, if desired.

The edge feature identification and selection criteria described in relation to the zero-crossing filter and the high pass filter may be switched with one another, if desired. In addition, any of the previously described techniques are likewise suitable for use with curved edges and arcs.

Figure 18:
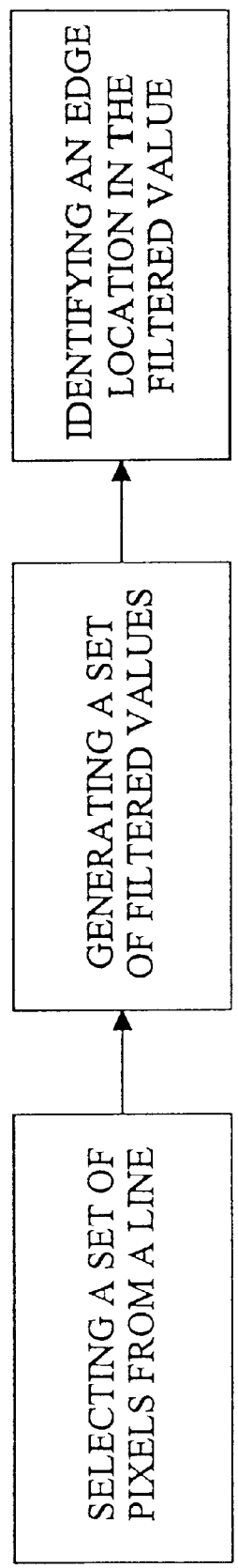
FIG. 18 shows an exemplary embodiment of the steps of the invention.

FIG. 18 shows an exemplary embodiment of the steps of the invention.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of processing a video field of an interlaced video containing at least a first line and a second line, where each of said first and second lines includes a plurality of pixels, to generate an interpolated line where said interpolated line includes a plurality of interpolated pixels located intermediate said first and second lines, said method comprising the steps of:

(a) selecting a first set of said pixels from said first line of said field;
   (b) generating a first set of filtered values by filtering said first set of said pixels with a first filter;
   (c) identifying at least one edge location in said first set of said filtered values by a first filtered value of said first set of said filtered values being at least one of less than and equal to a first predetermined value and a second filtered value of said first set of said filtered values being at least one of greater than and equal to said first predetermined value;
   (d) selecting a second set of said pixels from said second line of said field;
   (e) generating a second set of filtered values by filtering said second set of said pixels with a second filter;
   (f) identifying at least one edge location in said second set of said filtered values by a first filtered value of said second set of said filtered values being at least one of less than and equal to a second predetermined value and a second filtered value of said second set of said filtered values being at least one of greater than and equal to said second predetermined value; and
   (g) interpolating based on said at least one said edge location of step (c) and said at least one said edge location of step (f) to generate at least one of said interpolated pixels of said interpolated line.

2. The method of claim 1 wherein said first set of said pixels includes at least three pixels and said second set of said pixels includes at least three pixels.

3. The method of claim 1 wherein at least one of said first filter and said second filter is a high pass filter.

4. The method of claim 1 wherein at least one of said first filter and said second filter is a second order filter.

5. The method of claim 1 wherein said first line and said second line are adjacent lines of one field of an interlaced video image.

6. The method of claim 1 wherein at least one of said first predetermined value and said second predetermined value is zero.

7. The method of claim 1 wherein said first filter and said second filter are independent of each other.

8. The method of claim 4 wherein said at least one of said first filter and said second filter is [−1 2 −1].

9. The method of claim 3 wherein said at least one of said first filter and said second filter is [+1 +3 −3 −1].

10. The method of claim 1, further comprising the steps of:

(a) selecting a third set of pixels from said third line;
   (b) generating a third set of filtered values by filtering said third set of said pixels with a third filter;
   (c) identifying at least one edge location in said third set of said filtered values by a first filtered value of said third set of said filtered values being at least one of less than and equal to a third predetermined value and a second filtered value of said third set of said filtered values at least one of being greater than and equal to said third predetermined value; and
   (f) interpolating based on said at least one said edge location of said second line and said at least one said edge location of said third line to generate at least one interpolated pixel of an interpolated line located intermediate said second and third lines.

11. The method of claim 10 wherein said second set of said filtered values is only calculated once.

12. The method of claim 1 wherein said first and second predetermined values are the same value.

13. A method of processing an image containing at least a first line, a second line, and a third line, where each of said first, second, and third lines includes a plurality of pixels, to generate an interpolated line where said interpolated line includes a plurality of interpolated pixels located intermediate said first and third lines, said method comprising the steps of:

(a) selecting a first set of said pixels from said first line, a second set of said pixels from said second line, and a third set of pixels from said third line;
   (b) generating a first set of filtered values by filtering said first set of said pixels with a first filter, a second set of filtered values by filtering said second set of said pixels with a second filter, and a third set of filtered values by filtering said third set of said pixels with a third filter;
   (c) selecting at least one of a plurality of putative edge features based upon a first selection criteria where each putative edge feature is defined by a set of filtered values including at least one filtered value of said first set of filtered values, at least one filtered value of said second set of filtered values, and at least one filtered value of said third set of filtered values, and said first selection criteria is defined by at least two of said at least one filtered value of said first set of filtered values, said at least one filtered value of said second set of filtered values, and said at least one filtered value of said third set of filtered values being at least one of greater than and equal to a predetermined value and at least one of less than and equal to said predetermined value; and (d) interpolating based on said selecting at least one of a plurality of putative edge features to generate at least one of said interpolated pixels of said interpolated line.

14. The method of claim 13 wherein said first set of said pixels, said second set of said pixels, and said third set of said pixels includes at least three pixels.

15. The method of claim 13 wherein at least one of said first filter, said second filter, and said third filter is a high pass filter.

16. The method of claim 13 wherein at least one of said first filter, said second filter, and said third filter is a second order filter.

17. The method of claim 13 wherein said first line, said second line, and said third line are adjacent lines of one field of an interlaced video image.

18. The method of claim 13 wherein said predetermined value is zero.

19. The method of claim 13 wherein said predetermined value consists of a first predetermined value, a second predetermined value, a third predetermined value each of which is used to define said first selection criteria with respect to said first line, said second line, and said third line, respectively.

20. The method of claim 19 wherein said first, second, and third predetermined values are the same value.

21. The method of claim 13 wherein said first filter, second filter, and said third filter and said second filter are independent of each other.

22. The method of claim 13 wherein at least one of said first filter, said second filter, and said third filter is [−1 2 −1].

23. The method of claim 13 wherein at least one of said first filter, said second filter and said third filter is [+1 +3−3−1].

24. The method of claim 13 wherein said first set of said filtered values, said second set of said filtered values, and said third set of said filtered values are only calculated once.

25. The method of claim 13, further comprising the steps of:
(a) selecting a fourth set of said pixels from a fourth line;
(b) generating a fourth set of filtered values by filtering said fourth set of said pixels with a fourth filter;
(c) selecting at least one of a plurality of said putative edge features based upon said first selection criteria where each putative edge feature further includes said at least one filtered value of said fourth set of filtered values and said first selection criteria is defined by at least three of said at least one filtered value of said first set of filtered values, said at least one filtered value of said second set of filtered values, said at least one filtered value of said third set of filtered values, and said at least one filtered value of said fourth set of filtered values being at least one of greater than and equal to a predetermined value and at least one of less than and equal to said predetermined value; and (d) interpolating based on said selecting at least one of a plurality of putative edge features to generate at least one of said interpolated pixels of said interpolated line.

26. The method of claim 13 further comprising the steps of:
(a) said selecting at least one of a plurality of putative edge features is based upon said first selection criteria and said second selection criteria, said second selection criteria is defined by at least two filtered values of a filtered value of said first set of filtered values, a filtered value of said second set of filtered values, and a filtered value of said third set of filtered values being the other one of said at least one of said greater than and equal to said predetermined value and said at least one of said less than and equal to said predetermined value selected for said first selection criteria; and
(b) interpolating based on said selecting at least one of a plurality of putative edge features including said first selection criteria and not said second selection criteria to generate at least one of said interpolated pixels of said interpolated line.

27. A system for processing an image comprising:
(a) an intra-field interpolator receives at least a portion of a first line of said image and a portion of a second line of said image, where each of said first and second lines includes a plurality of pixels each of which has a corresponding pixel luminance value;
(b) said intra-field interpolator in response to receiving said portion of said first line and said portion of said second line filters said corresponding pixel luminance values to generate a first set of filtered values for said first line and a second set of filtered values for said second line where each of said filtered values of said first set and each of said filtered values of said second set are characterized as at least one of a first condition and a second condition where said first condition is characterized as being at least one of greater than and equal to a predetermined value and said second condition is characterized as being at least one of less than and equal to said predetermined value; and
(c) said intra-field interpoltor generates an interpolated pixel located intermediate said first and second lines based on said first condition and said second condition of said filtered values of said first and second lines.

28. A method of processing an image containing at least a first line and a second line, where each of said first and second lines includes a plurality of pixels, to generate an interpolated line where said interpolated line includes a plurality of interpolated pixels located intermediate said first and second lines, said method comprising the steps of:
(a) selecting a first set of said pixels from said first line;
(b) generating a first set of filtered values by filtering said first set of said pixels with a first filter;
(c) identifying at least one edge location in said first set of said filtered values by a first filtered value of said first set of said filtered values being at least one of less than and equal to a first predetermined value and a second filtered value of said first set of said filtered values being at least one of greater than and equal to said first predetermined value;
(d) selecting a second set of said pixels from said second line;
(e) generating a second set of filtered values by filtering said second set of said pixels with a second filter;
(f) identifying at least one edge location in said second set of said filtered values by a first filtered value of said second set of said filtered values being at least one of less than and equal to a second predetermined value and a second filtered value of said second set of said filtered values being at least one of greater than and equal to said second predetermined value; and (g) interpolating based on said at least one said edge location of step (c) and said at least one said edge location of step (f) to generate at least one of said interpolated pixels of said interpolated line, wherein said first set of said pixels includes at least three pixels and said second set of said pixels includes at least three pixels.

29. A method of processing an image containing at least a first line and a second line, where each of said first and second lines includes a plurality of pixels, to generate an interpolated line where said interpolated line includes a plurality of interpolated pixels located intermediate said first and second lines, said method comprising the steps of:

(a) selecting a first set of said pixels from said first line;

(b) generating a first set of filtered values by filtering said first set of said pixels with a first filter;

(c) identifying at least one edge location in said first set of said filtered values by a first filtered value of said first set of said filtered values being at least one of less than and equal to a first predetermined value and a second filtered value of said first set of said filtered values being at least one of greater than and equal to said first predetermined value;

(d) selecting a second set of said pixels from said second line;

(e) generating a second set of filtered values by filtering said second set of said pixels with a second filter;

(f) identifying at least one edge location in said second set of said filtered values by a first filtered value of said second set of said filtered values being at least one of less than and equal to a second predetermined value and a second filtered value of said second set of said filtered values being at least one of greater than and equal to said second predetermined value; and (g) interpolating based on said at least one said edge location of step (c) and said at least one said edge location of step (f) to generate at least one of said interpolated pixels of said interpolated line, wherein at least one of said first filter and said second filter is a high pass filter.

30. A method of processing an image containing at least a first line and a second line, where each of said first and second lines includes a plurality of pixels, to generate an interpolated line where said interpolated line includes a plurality of interpolated pixels located intermediate said first and second lines, said method comprising the steps of:

(a) selecting a first set of said pixels from said first line;

(b) generating a first set of filtered values by filtering said first set of said pixels with a first filter;

(c) identifying at least one edge location in said first set of said filtered values by a first filtered value of said first set of said filtered values being at least one of less than and equal to a first predetermined value and a second filtered value of said first set of said filtered values being at least one of greater than and equal to said first predetermined value;

(d) selecting a second set of said pixels from said second line;

(e) generating a second set of filtered values by filtering said second set of said pixels with a second filter;

(f) identifying at least one edge location in said second set of said filtered values by a first filtered value of said second set of said filtered values being at least one of less than and equal to a second predetermined value and a second filtered value of said second set of said filtered values being at least one of greater than and equal to said second predetermined value; and (g) interpolating based on said at least one said edge location of step (c) and said at least one said edge location of step (f) to generate at least one of said interpolated pixels of said interpolated line, wherein at least one of said first filter and said second filter is a second order filter.

31. A method of processing an image containing at least a first line and a second line, where each of said first and second lines includes a plurality of pixels, to generate an interpolated line where said interpolated line includes a plurality of interpolated pixels located intermediate said first and second lines, said method comprising the steps of:

(a) selecting a first set of said pixels from said first line;

(b) generating a first set of filtered values by filtering said first set of said pixels with a first filter;

(c) identifying at least one edge location in said first set of said filtered values by a first filtered value of said first set of said filtered values being at least one of less than and equal to a first predetermined value and a second filtered value of said first set of said filtered values being at least one of greater than and equal to said first predetermined value;

(d) selecting a second set of said pixels from said second line;

(e) generating a second set of filtered values by filtering said second set of said pixels with a second filter;

(f) identifying at least one edge location in said second set of said filtered values by a first filtered value of said second set of said filtered values being at least one of less than and equal to a second predetermined value and a second filtered value of said second set of said filtered values being at least one of greater than and equal to said second predetermined value; and (g) interpolating based on said at least one said edge location of step (c) and said at least one said edge location of step (f) to generate at least one of said interpolated pixels of said interpolated line, wherein said first line and said second line are adjacent lines of one field on an interlaced video image.

32. The method of claim 30 wherein said at least one of said first filter and said second filter is [−1 2 −1].

33. A method of processing an image containing at least a first line and a second line, where each of said first and second lines includes a plurality of pixels, to generate an interpolated line where said interpolated line includes a plurality of interpolated pixels located intermediate said first and second lines, said method comprising the steps of:

(a) selecting a first set of said pixels from said first line;

(b) generating a first set of filtered values by filtering said first set of said pixels with a first filter;

(c) identifying at least one edge location in said first set of said filtered values by a first filtered value of said first set of said filtered values being at least one of less than and equal to a first predetermined value and a second filtered value of said first set of said filtered values being at least one of greater than and equal to said first predetermined value;

(d) selecting a second set of said pixels from said second line;

(e) generating a second set of filtered values by filtering said second set of said pixels with a second filter;

(f) identifying at least one edge location in said second set of said filtered values by a first filtered value of said second set of said filtered values being at least one of less than and equal to a second predetermined value and a second filtered value of said second set of said filtered values being at least one of greater than and equal to said second predetermined value;

(g) interpolating based on said at least one said edge location of step (c) and said at least one said edge location of step (f) to generate at least one of said interpolated pixels of said interpolated line;

(h) selecting a third set of pixels from a third line;

(i) generating a third set of filtered values by filtering said third set of said pixels with a third filter;

(j) identifying at least one edge location in said third set of said filtered values by a first filtered value of said third set of said filtered values being at least one of less than and equal to a third predetermined value and a second filtered value of said third set of said filtered values at least one of being greater than and equal to said third predetermined value; and (k) interpolating based on said at least one said edge location of said second line and said at least one said edge location of said third line to generate at least one interpolated pixel on an interpolated line located intermediate said second and third lines.

34. The method of claim 29 wherein said at least one of said first filter and said second filter is [+1 +3 −3 −1].

35. The method of claim 33 wherein said second set of said filtered values is only calculated once.

36. A method of processing an image containing at least a first line and a second line, where each of said first and second lines includes a plurality of pixels, to generate an interpolated line where said interpolated line includes a plurality of interpolated pixels located intermediate said first and second lines, said method comprising the steps of:

(a) selecting a first set of said pixels from said first line;

(b) generating a first set of filtered values by filtering said first set of said pixels with a first filter;

(c) identifying at least one edge location in said first set of said filtered values by a first filtered value of said first set of said filtered values being at least one of less than and equal to a first predetermined value and a second filtered value of said first set of said filtered values being at least one of greater than and equal to said first predetermined value;

(d) selecting a second set of said pixels from said second line;

(e) generating a second set of filtered values by filtering said second set of said pixels with a second filter;

(f) identifying at least one edge location in said second set of said filtered values by a first filtered value of said second set of said filtered values being at least one of less than and equal to a second predetermined value and a second filtered value of said second set of said filtered values being at least one of greater than and equal to said second predetermined value; and (g) interpolating based on said at least one said edge location of step (c) and said at least one said edge location of step (f) to generate at least one of said interpolated pixels of said interpolated line, wherein said first and second predetermined values are the same value.

* * * * *

UNITED STATES PATENT AND TRADEMARK OFFICE
CERTIFICATE OF CORRECTION

PATENT NO. : 6,262,773 B1 Page 1 of 1
APPLICATION NO. : 08/929499
DATED : September 15, 1997
INVENTOR(S) : Larry Alan Westerman It is certified that error appears in the above-identified patent and that said Letters Patent is hereby corrected as shown below:

Column 3, line 34
Change "Dong-I1" to --Dong-IL--

Column 4, line 9
Change "estimate of the velocity" to --estimate the velocity--

Column 7, line 53-54
Change "filtered value of from a set" to --filtered value or from a set--

Column 12, line 42
Change "(f)" to --(d)--

Column 14, line 41
Change "interpoltor" to --interpolator--

Signed and Sealed this

Twenty-ninth Day of May, 2007

JON W. DUDAS
*Director of the United States Patent and Trademark Office*

UNITED STATES PATENT AND TRADEMARK OFFICE
CERTIFICATE OF CORRECTION

PATENT NO. : 6,262,773 B1
APPLICATION NO. : 08/929499
DATED : July 17, 2001
INVENTOR(S) : Larry Alan Westerman It is certified that error appears in the above-identified patent and that said Letters Patent is hereby corrected as shown below:

Column 3, line 34
Change "Dong-Il" to --Dong-IL--

Column 4, line 9
Change "estimate of the velocity" to --estimate the velocity--

Column 7, line 53-54
Change "filtered value of from a set" to --filtered value or from a set--

Column 12, line 42
Change "(f)" to --(d)--

Column 14, line 41
Change "interpoltor" to --interpolator--

This certificate supersedes Certificate of Correction issued May 29, 2007.

Signed and Sealed this

Tenth Day of July, 2007

JON W. DUDAS
*Director of the United States Patent and Trademark Office*